United States Patent [19]
Fleming, Jr.

[11] Patent Number: 5,308,947
[45] Date of Patent: May 3, 1994

[54] IRIDIUM FIBER DRAW INDUCTION FURNACE

[75] Inventor: James W. Fleming, Jr., Westfield, N.J.

[73] Assignee: AT&T Bell Laboratories, Murray Hill, N.J.

[21] Appl. No.: 23,178

[22] Filed: Feb. 25, 1993

Related U.S. Application Data

[63] Continuation of Ser. No. 828,256, Jan. 30, 1992, abandoned.

[51] Int. Cl.$^5$ ............................................. H05B 6/22
[52] U.S. Cl. ...................................... 219/634; 65/12; 65/DIG. 4; 373/162
[58] Field of Search ............ 219/10.491, 10.67, 10.41, 219/10.43; 65/12, DIG. 4; 373/162, 163, 164, 155

[56] References Cited

U.S. PATENT DOCUMENTS

| | | | |
|---|---|---|---|
| 3,716,345 | 2/1973 | Grabmaier | 156/620.2 |
| 3,933,572 | 1/1976 | O'Connor et al. | 156/608 |
| 4,450,333 | 5/1984 | Andrejco et al. | 219/10.491 |
| 4,533,378 | 8/1985 | Paek et al. | 219/10.491 |
| 4,547,644 | 10/1985 | Bair et al. | 219/10.491 |
| 4,608,473 | 8/1986 | Paek et al. | 219/10.491 |

FOREIGN PATENT DOCUMENTS 3025680 2/1982 Fed. Rep. of Germany .

OTHER PUBLICATIONS

R. B. Runk, "A Zirconia Induction Furnace For Drawing Precision Silica Wave Guides", *Optical Fiber Transmission II,* (TuB5-1) 1977.
European Search Report, EP93-300350 Apr. 12, 1993.

*Primary Examiner*—Philip H. Leung
*Attorney, Agent, or Firm*—Eileen D. Ferguson

[57] ABSTRACT

An induction furnace for reflowing a portion of an optical preform in order to draw a lightguide fiber therefrom. The furnace has an axially located tubular iridium susceptor which is centrally disposed within a beaker and a sleeve is positioned concentrically around the susceptor. The sleeve is surrounded by an insulating grain. A high frequency coil is energized to couple its electromagnetic field to the iridium susceptor to heat and reflow a portion of the preform in order to draw the fiber therefrom. The furnace housing is sealed to provide an inert, non-oxidizing atmosphere for the iridium susceptor.

6 Claims, 1 Drawing Sheet

IRIDIUM FIBER DRAW INDUCTION FURNACE

This application is a continuation of application Ser. No. 07/828,256, filed on Jan. 30, 1992, abandoned.

FIELD OF THE INVENTION

This invention relates to a furnace for heating a preform from which lightguide fiber is drawn. More specifically, it relates to an induction heating furnace which has an iridium susceptor.

BACKGROUND OF THE INVENTION

The development of low loss, fused silica lightguide fiber over the last few years has led to the investigation of high temperature (e.g., approximately 2000° C.) heat sources, for the drawing of high strength fiber from a lightguide preform. Of the possible heat sources, the oxy-hydrogen torch, the $CO_2$ laser and induction and resistance furnaces have been employed for drawing the high silica fibers. The torch method, while inexpensive, cannot maintain a uniform diameter over long lengths of fiber. The $CO_2$ laser provides the cleanest drawing atmosphere, but requires special optical designs to radially distribute the energy for drawing and is limited in power. Induction furnaces are among the most useful high temperature sources.

An induction furnace is described in an article by R. B. Runk entitled "A Zirconia Induction Furnace for Drawing Precision Silica Waveguides" which was published in the *Optical Fiber Transmission II Technical Digest* (TuB5-1), Feb. 22-24, 1977. Typically, an induction furnace uses a zirconia susceptor. The susceptor has a tubular shape and acts as a semiconductor when heated to temperatures above 1400° C. After the zirconia susceptor has reached the desired temperature of approximately 2100° C., a glass preform is then introduced into the middle of the susceptor, known as the hot zone, a portion of the preform is reflowed, and lightguide fiber is drawn therefrom.

Induction furnaces with zirconia susceptors, however, are subject to various problems including preheating delays, spalling, fractures and low melting eutectic formation. Newly installed induction furnaces with a zirconia susceptor must be preheated to temperatures of at least 2000° C. It takes numerous hours for the zirconia susceptor to reach such temperatures. Because zirconia acts like an insulator up to temperatures of approximately 1400° C. a pre-heat susceptor such as a graphite slug is placed in the center of the zirconia susceptor. The graphite slug couples to the susceptor, elevating the temperature of the zirconia susceptor above the 1400° C. mark and enabling the susceptor to become a semiconductor instead of an insulator.

In order to preserve fiber strength, it is necessary to prevent contamination of the preform and fiber surfaces. During the first several days of drawing fiber from a furnace with a zirconia susceptor, a lower than average fiber yield is produced. The reason for the reduced quality of fiber produced is due to spalling zirconia particles which deposit on the fiber and/or preform that creates flaws that typically cause fiber breaks. Particles of zirconia can also become separated from the susceptor if cracks develop due to temperature cycling such as during start up, temporary power loss, or aging. As a result of the zirconia particles depositing on the fiber, a significant quantity of the overall fiber drawn from the furnace is not of an acceptable quality.

Once a zirconia susceptor has been heated, the susceptor must be kept above 1400° C. in order to remain coupled. When the furnace is shut down, due to a power failure or draw problems, the zirconia cools through its structural transition, cracks, and must be replaced. Having to replace the zirconia susceptor causes the furnace to be out of operation for an extensive amount of time because the zirconia susceptor must be heated and stabilized. From a manufacturing standpoint it would be beneficial to have the furnaces active for a greater percentage of time than current factors permit.

Another common drawback associated with zirconia susceptors is that furnace failure results when a preform comes in contact with a hot zirconia susceptor. The preform generally sticks to the susceptor wall. Removal can lead to cracking of the zirconia. Additionally, because $SiO_2$ and $ZrO_2$ react to form a lower melting eutectic composition, the zirconia susceptor tubes can fail after such contact through the formation of a large defective region. Accordingly, there is a need for an improved induction furnace.

SUMMARY OF THE INVENTION

The present invention is predicated upon the discovery that an iridium susceptor overcomes the problems of preheating delays, spalling, fractures on cooling and low melting eutectic formation when in combination with silica.

This invention is an induction furnace for drawing lightguide fiber from a preform comprised of a sealed housing, an iridium susceptor means and a high frequency induction coil which surrounds the iridium susceptor. The furnace is further comprised of a thermally insulating material which surrounds the iridium susceptor means. The thermally insulating material is comprised of a silica beaker with an aperture in the bottom surface, a layer of aluminosilicate insulation lines the inside walls of the beaker, a layer of refractory grain surrounds the inner walls of said insulation layer, and a zirconia tube presses up against the zirconia grain. The sealed housing is surrounded by a cooling chamber and has an atmospheric inlet/outlet control port. The atmospheric inlet/outlet control port enables an inert gas to be supplied into the housing of the furnace. Additionally, the high frequency induction coil is powered by a 10-200 kHz power supply for efficient coupling of the iridium susceptor.

DETAILED DESCRIPTION

Figure 1:
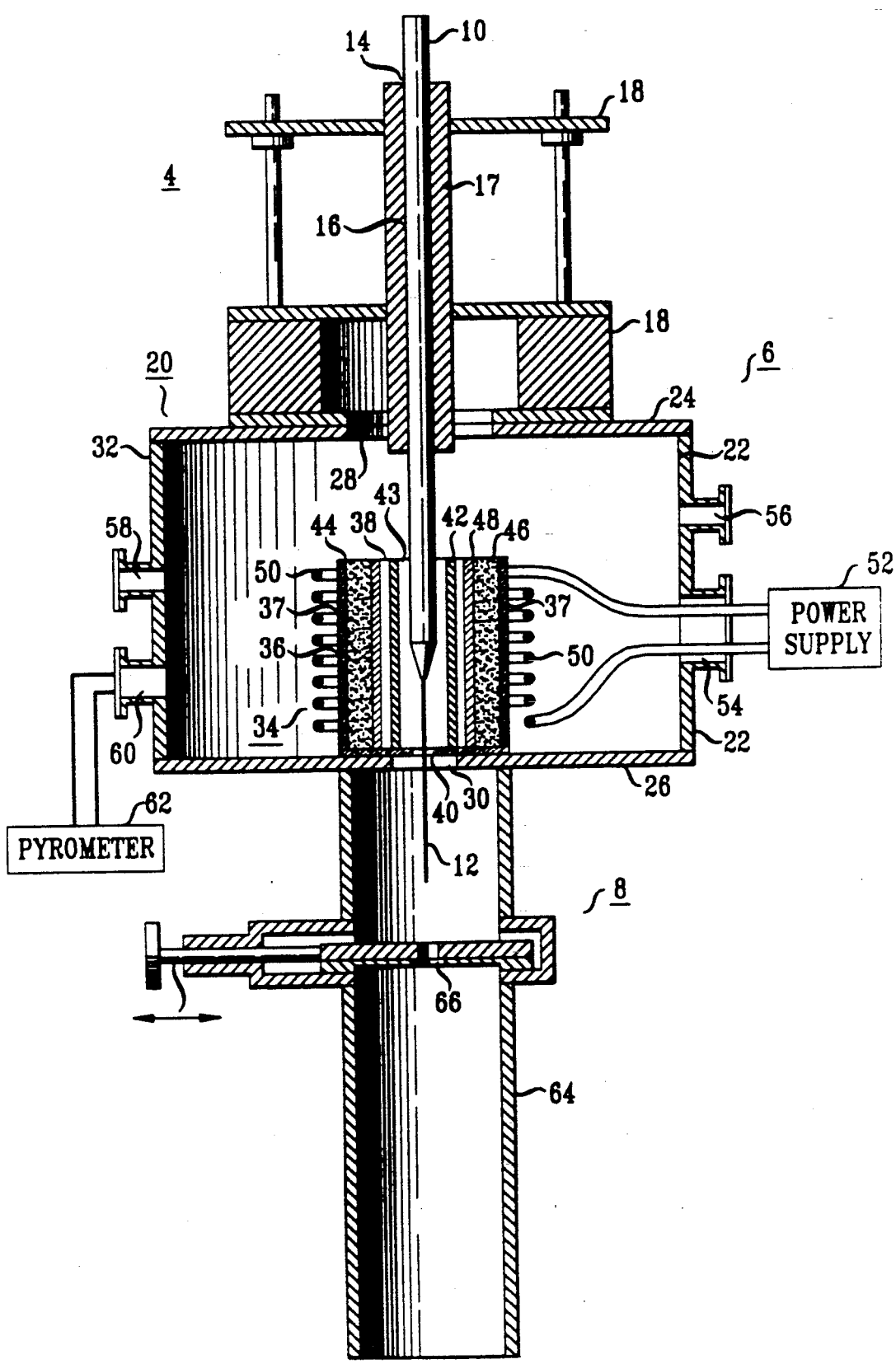
FIG. 1 is a cross-sectional view of an induction furnace of this invention.

Referring to FIG. 1, there is shown an induction heating furnace 2 which is used to draw lightguide fiber from a preform. The furnace 2 is divided into three sections, the loading section 4, the heating core 6 and the draw section 8. The loading section 4 directs the preform 10 into the heating core 6 wherein a portion of the preform 10 is heated to reflow. The draw section 8 then draws the preform 10 from the heating core 6 into lightguide fiber 12.

The loading section 4 is comprised of a preform feed port 14, a sleeve 16 and supporting apparatus 18 for the sleeve 16. The preform 10 enters into the sleeve 16 in an axial direction via the feed port. The sleeve 16 is positioned in an axial direction and extends into the heating core 6. The sleeve 16 can be moved vertically for systematic delivery of the preform 10 into the heating core 6 so that the preform 10 is positioned in the center of the heating core 6. The diameter of the sleeve 16 varies with the size of the preform 10. The preform 10 is sealed in the sleeve 16 so that a positive pressure can be maintained in the heating core 6 at all times. The support apparatus 18 holds the sleeve 16 in place. The support apparatus 18 is adjustable enabling the size of the sleeve 16 to vary.

The heating core 6, which is the main part of the furnace 2, is comprised of a sealed housing 20 which preferably has at least one side wall 22, a top portion 24, and a bottom portion 26. The top portion 24 has a central opening 28 which is vertically aligned with an opening 30 in the bottom portion 26. The top portion 24 of the housing 20 is removable. The housing 20 is also surrounded by a water chamber 32 or the like, which cools the housing 20 and also acts as a shield to reduce stray radio-frequency fields. The housing 20 can be constructed of various materials, including copper, stainless steel, and ceramic and is sealed so that a positive pressure can be maintained in the housing 20.

Centered above the bottom opening 30 is a heating element 34. The heating element 34 is made of a silica vessel 36, which has a sidewall 37, is open at the top 38, has a circular aperture 40 in the bottom surface thereof which is axially aligned with the openings 28 and 30. The sidewall 37 is flame sealed to the bottom surface of the silica vessel 36.

The inner walls of silica vessel 36 are insulated as with a layer of aluminosilicate insulation 44 and, next to the layer of aluminosilicate insulation 44, an insulation layer of refractory grog or grain 46 that can be optionally bounded by a dense insulating tube 48. An iridium susceptor 42 is disposed radially within the insulating layers and is located centrally within the silica vessel 36. The zirconia tube 48 which holds the grain 46 in position is advantageous but not required. The tube 48 allows for easy removal of the susceptor 42 when the susceptor 42 needs to be replaced. The iridium susceptor 42 can be positioned up against the grain 46 when the tube 48 is not used or the susceptor 42 is spaced slightly apart from the tube 48 when the tube 48 is present. The interior surface 43 of the susceptor 42 is known as the furnace bore.

At the top 38 and bottom of the silica vessel 36, annular, felt-like discs (not shown) are placed to help prevent the movement of contaminating particles of the refractory grain 46 into the interior of the susceptor 42 and onto the preform and/or fiber. The discs also prevent inadvertent movement of the heating element 34. A detail discussion of the felt-like discs is described in Bair et al., U.S. Pat. No. 4,547,644, issued on Oct. 15, 1985, entitled "Apparatus For Heating A Preform From Which Lightguide Fiber Is Drawn" which is incorporated by reference herein.

In the preferred embodiment the silica vessel 36 is a standard 5 inch diameter by 10 inch long beaker. The aluminosilicate insulation 44 is Fiberfrax manufactured by Carborundum Co. of Niagra Falls, N.Y., and is about 3 mm thick. The grain 46 is electrically fused monoclinic zirconia manufactured by TAM Ceramics of Niagra Falls, N.Y. The insulating tube 48 is made of zirconia which is about 5 mm thick and equal in length to the beaker 36. The iridium susceptor 42 tube may be comprised of a single segment or a plurality of segments.

The susceptor 42 is slightly longer than the beaker 36 and approximately 2 inches in diameter An RF induction coil 50, of circular or rectangular cross-section, is mounted to the outside of the silica vessel 36. A power supply 52 is connected to the coil 50 via a power port 54 in the housing 20. Generally the silica vessel 36 is disposed in the induction coil 50 such that the coil 50 is located at the vertical midpoint of the susceptor 42. Practice has shown that an 8 turn work induction coil and a 10-100 kHz power supply is efficient for the coupling of iridium susceptor 42. Because of the low resistivity of iridium, in the preferred embodiment a 60 kW, 120 kHz generator was used to couple to the iridium susceptor 42. Because the RF field is not coupled to the high resistivity zirconia grain 46 which has a relatively large particle size and is coarse, the grain 46 acts as an insulator to maintain the elevated temperature within the susceptor 42 during the operation of the furnace 2.

At high temperatures iridium reacts slowly with oxygen. Consequently, an atmospheric control port 56 is provided in the housing 20. The port 56 enables an inert gas or nitrogen to be supplied into the housing 20. Because the housing 20 is sealed, a positive pressure atmosphere is maintained during the operation of the furnace 2 to prevent the iridium susceptor 42 from oxidizing. The top surface 24 of the housing 20 is also equipped with a silica apparatus (not shown) that directs a flow of inert gas or nitrogen over the inside and outside surfaces of the iridium susceptor 42. The flow rate of the gas is about 5 l/min.

There are also two site ports 58 and 60 for viewing the thermally active region of the assembly. The site port 60 is aligned to permit observation of the outside wall of the iridium susceptor 42 at a position about in the middle length of the iridium susceptor 42. An infrared optical pyrometer 62 is attached to site port 60 to monitor and control the temperature of the iridium susceptor 42 in the heating element 34 to within plus or minus 2° C. of the desired temperature. Fiber drawing temperatures normally are between 1900° C. and 2200° C., depending on the size of the preform and the speed and tension at which the fiber is drawn. An optical brightness pyrometer can be used in place of or to verify the readings of the infrared optical pyrometer.

Below the heating core 6 is the draw section 8. The draw section 8 is primarily comprised on a cylindrical tube 64 and gate valves 66. The tube 64 is attached to the housing 20 so that after the fiber 12 passes through the aperture 40 in the silica vessel 36 and the opening 30 in the bottom surface 26 of the housing 20 and enters the tube 64. Near the top of the tube 64 are gate valves 66. The gate valves 66 open to allow the fiber 12 to exit the heating core 6 and enter the tube 64. Below the gate valves 66 is a meter long section of tubing 64. The tubing 64 and gate valves 66 prevent atmosphere contamination of the furnace 2 as well as maintain the housing 20 at positive pressure during operation of the furnace 2 to prevent the oxidizing of the iridium susceptor 42.

Generally, before the furnace 2 is operational the top portion 24 of the housing 20 is sealed closed. The housing 20 is filled with an inert gas or nitrogen through the atmospheric control port 56 creating a positive pressure in the housing 20 and purging both the internal and external surfaces of the iridium susceptor 42. Upon achieving a positive pressure atmosphere in the housing 20, the power supply 52 is activated, causing the induction coil 50 to couple the iridium susceptor 42 so that the iridium susceptor 42 reaches a temperature of approximately 2100° C. At this time the preform 10 is lowered into the furnace bore 43, where a portion of the preform 10 becomes reflowing and lightguide fiber is drawn.

Note, prior to using an iridium furnace 2 for the first time, the entire core 6 should be prefired to a temperature of 1100° C. to 1200° C. to stabilize the insulation layers in the heating element 34. This step is only necessary with a new furnace 2 to prevent contamination which may be caused by the insulation layers being in a non-oxidizing atmosphere.

The above-described procedure was conducted numerous times. The furnace 2 was heated to fiber draw temperatures for several hundred hours, the temperature was cycled between near room temperature and 2000 degrees over 20 times, and the iridium susceptor was subjected to silica contact several times. After these tests, the iridium susceptor 42 is in almost the same condition as when the investigation began.

During testing of the furnace 2, two kilometers of fiber 12 was drawn from a 19 mm diameter silica single mode preform 10 rod. The drawing was done manually using a continuous preform feed. Fiber diameter varied from <100 um to >500 um. Draw rates averaged about 2 m/sec. Draw tension was not monitored and the fiber 12 was not coated. Sections were examined microscopically for surface deposits. No signs of unusual deposits were found. The iridium susceptor 42 was checked for weight loss using a digital balance accurate to 0.01 gm. No weight loss was detected over the entire study.

When the preform 10 was intentionally brought in contact with the iridium susceptor 42 at draw temperatures, large pieces of the preform 10 stuck to the susceptor 42 and could not be removed. Because of the fact that iridium has a much higher thermal expansion coefficient than silica, when the furnace 2 was shut down and the iridium susceptor 42 cooled, the preform 10 as well as any additional silica which had attached to the susceptor 42 released from the susceptor 42 and no damage was caused to the iridium susceptor 42. Thus, the furnace 2 could be fired up and processing continued immediately without having to replace the susceptor 42, wait for the preheating of the susceptor 42 or wait for particles from the new zirconia susceptor 42 to stop migrating to the preform 10 and or fiber 12.

Fiber strength has been correlated to furnace life, with longer life furnaces providing higher strength fibers. Furnace life may be optimized by using iridium susceptors, by careful handling and assembly, and by exercising care during start up and during use.

These developments have provided an iridium furnace which is capable of long life. The new design reduces preheating delays, fractures on cooling, improves significantly protection against particle contamination, the escape of particles into the furnace bore, and provides a more accurate and reliable furnace assembly.

I claim:

1. An induction furnace for heating a silica lightguide preform to a temperature in the range of approximately 1900° C. to 2200° C. in order to draw lightguide fiber therefrom, comprising:
    a) a housing which includes a sidewall, a top and a base, each of said top and base having an aperture, said apertures being vertically aligned;
    b) a tubular member having a top and bottom aperture in alignment with said housing apertures, said tubular member being supported on said housing base and enclosed by said housing sidewall, said tubular member comprises:
        i) a beaker having a sidewall and a base, said base having an aperture which is in alignment with said housing apertures;
        ii) a tubular susceptor having a circular bore of a diameter sufficient to receive therein a preform without said preform contacting said susceptor, said susceptor being supported and surrounded by said beaker;
        iii) insulating solid material disposed between said susceptor and said beaker; and
    c) an RF induction coil enclosed by said sidewall of said housing and surrounding said beaker; wherein
    d) the tubular susceptor consists essentially of iridium.

2. An induction furnace according to claim 1 wherein said tubular member further comprises an insulating tube disposed between said susceptor and said insulating material.

3. An induction furnace according to claim 1 wherein said insulating material is a layer of aluminosilicate insulation adjacent said sidewall of said beaker and a layer of refractory grain adjacent said layer of aluminosilicate insulation.

4. An induction furnace according to claim 1 further comprising means for supplying an inert gas atmosphere into said housing.

5. An induction furnace according to claim 1 wherein said housing is surrounded by a cooling chamber.

6. An induction furnace according to claim 1 wherein said RF induction coil is powered by a 10–200 kHz power supply.

* * * * *